United States Patent Office 3,297,045
Patented Jan. 10, 1967

3,297,045
PROCESS VARIABLE TRANSMITTER AND
IMPROVEMENTS THEREIN
Richard G. Beach, Greece, Carl E. Eksten, Jr., Sweden, Howard R. Jaquith, Rochester, and Stanley C. Norton, Jr., Spencerport, N.Y., assignors to Taylor Instrument Companies, Rochester, N.Y., a corporation of New York
Filed Jan. 22, 1964, Ser. No. 339,553
16 Claims. (Cl. 137—85)

This invention relates to novel improved process variable transmitters of the type responsive to a process variable to convert a process variable to a force and simultaneously to provide a feedback force balancing the first said force.

One object of the invention is to provide a process variable transmitter as aforesaid wherein the effect of temperature on said transmitter is effectively obviated, and in particular to provide a novel arrangement for utilizing the effect of temperature-variant stiffness of parts in said transmitter.

Another object of the invention is to provide a process variable transmitter as aforesaid wherein a novel fulcrum is provided for adjusting the balancing effect of said feedback force.

Still another object of the invention is to provide a differential pressure transmitter having an improved arrangement for compensating for the effect of pressure level on said transmitter.

A further object of the invention is to provide a process variable transmitter according to the invention having novel housing and support structure for the operative parts thereof.

Other objects of the invention will be evident from the following description and the claims appended hereto.

Figures 1, 2, 3:
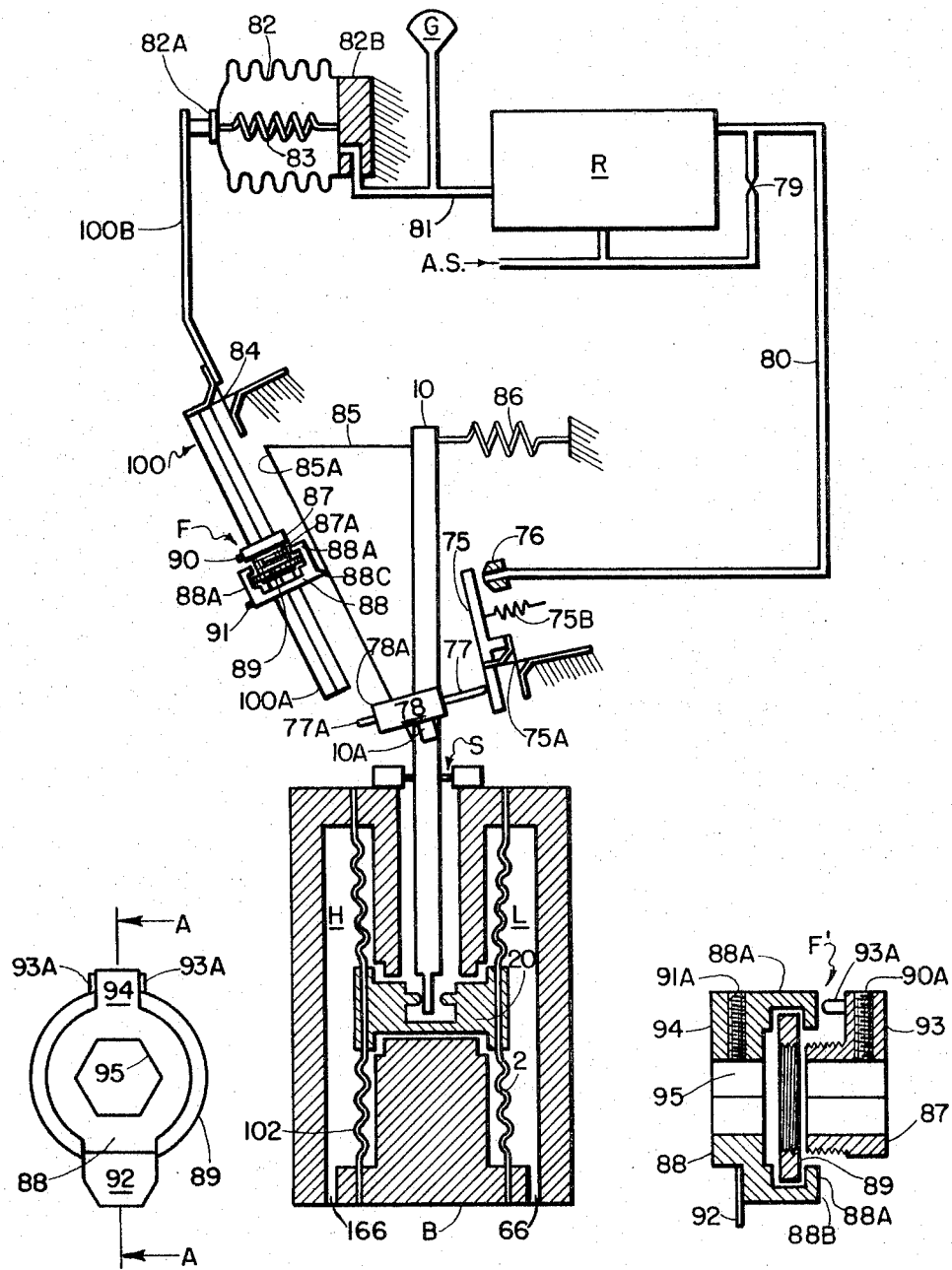
FIGURE 1 is a plan view, in schematic form, of a process variable transmitter in accordance with the invention.
FIGURE 2 is an elevation of a refined form of the fulcrum shown in FIGURE 1.
FIGURE 3 is a cross-section of the fulcrum of FIGURE 2, the section being taken on the plane A—A of FIGURE 2.

For purposes of illustration, a novel process variable transmitter according to the invention is typically provided with condition responsive means, such as the differential pressure responsive device disclosed and claimed in the co-pending application for patent of Kenneth L. Tate et al., S.N. 201,627, filed June 11, 1962, now Patent No. 3,176,380, granted February 23, 1965, assigned to the assignee of the present application, and entitled "Pressure Responsive Device."

Thus, in FIGURE 1 hereof, reference characters B, H, L and S and reference numerals 2, 10, 20, 66, 102 and 106, represent the elements thus denoted in FIGURE 1 of the said co-pending application, to which reference should be had for a more detailed explanation of the above said differential pressure device. For the purposes of the present application, it suffices to state that fluid pressures are admitted to chambers H and L of a body B via connections 106 and 66, that pressure admitted to chamber H normally being the higher, whereby a pressure differential is created across diaphragms 2 and 102 such as to cause more or less bodily motion of said diaphragms to the right. Spool 20, being rigidly attached to said diaphragms also moves to the right, therefore, and deflects beam 10 about a pivot axis, normal to the plane of the figure and defined by stay plate S which amounts to a combined pivot and seal defining said axis, whereby the upper end of beam 10 deflects counter-clockwise about said axis.

As stay plate S elastically resists deflection of beam 10 very stiffly, deflection of said beam is normally quite small. Accordingly, a baffle 75 and a nozzle 76 are provided to detect such deflection, baffle 75 being deflected by a pin 77 secured in a sleeve 78 mounted on an arm 10A of beam 10, and arranged so as to pivot said baffle about a cross-strip pivot 75A so located that there is a certain amount of amplification of the baffle motion at the nozzle 76, as compared to the baffle motion at the place thereon at which pin 77 acts. Baffle 75 is elastically biased by means such as a light spring 75B toward the nozzle, so that if pin 77 moves to the left, such bias causes baffle 75 to approach the nozzle.

Nozzle 76, which opens toward the next adjacent surface of baffle 75, is supplied with air under pressure from supply A.S., via a restriction 79 connecting the air supply line to a pipe 80, pipe 80 connecting nozzle 76 directly to a booster relay R, which is supplied with air under pressure from an air supply which may be said air supply A.S. The role of relay R is the conventional one of a so-called "booster relay," and need not be described further other than to say that it has an output pipe 81 which, if connected to a closed capacity, allows relay R to pressurize said capacity to a pressure larger than that in pipe 80, but varying in proportion thereto. For example a pressure gauge G, the responsive element of which may be a Bourdon tube, or the like, is shown connected to output pipe 81.

Output pipe 81 is also connected to a feedback bellows 82, which is elastically biased to expand or contract to dimensions proportional to the difference in pressure across the left-hand end of said bellows. Preferably, in this case, bellows is provided with a spring 83 which opposes motion of the left-hand end 82A of bellows 82 away from its right-hand end 82B, which latter is shown as being fixed in position.

It is desired to prevent, insofar as possible, deflection of beam 10 out of a given position defining zero or other said difference in the pressures admitted to chambers H and L, hence, there is provided a force lever 100, pivoted as by a cross-strip pivot 84 arranged to confine deflection of lever 100 to deflection about an axis parallel to the axes of deflection of beam 10 and baffle 75. It is to be observed that these three axes are otherwise fixed as is the right-hand end 82B of bellows 82.

One arm of lever 100 is an essentially rigid bar 100A having a fulcrum F affixed thereon, whereas the other arm of lever 100 is a leaf spring 100B. A rigid plate 85 is fixed to beam 10 and, by reason of its triangular shape oriented as shown, provides an increased effective length of beam 10 through which fulcrum F can be adjusted to apply different leverages to beam 10. As the left edge 85A of plate 85 is at an angle to the length of beam 10, it is as if beam 10 has been lengthened and bent to the left far enough that the upper end of the beam is at the same vertical level as the upper end of the beam 10 as shown. Plate 85 thus allows for improved compactness of the structure shown in the vertical direction, for a given effective length of beam 10, with respect to positioning fulcrum F therealong.

Assume relay R to create in bellows 82, a pressure that changes in proportion to the pressure in pipe 80, and the bellows 82 to expand against the tension of spring 83 so as to move its free end 82B in substantially exact proportion to the first said pressure. If beam 10 deflects counter-clockwise, baffle 75 throttles nozzle 76, increasing the pressure in pipe 80 on the other side of said restriction, whereby an equivalently increased pressure is created in bellows 82 by relay R, thus moving the left end of bellows 82 to the left and deflecting force lever 100 counter-clockwise as a result, a rightwardly directed force is exerted via fulcrum F on beam 10, forcing the beam 10 clockwise, very nearly back to the position from which the beam 10 originally deflected, aided by the elastic reaction of stay plate S, diaphragms 2 and 102, and a zero spring 86 all of which create a net force resisting deflection of beam 10 by the force of differential pressure. As a result, the magnitude of the pressure in bellows 82, as measured by gauge G, say, will have substantially straight line relationship with the differential pressure across diaphragms 2 and 102.

The foregoing action is substantially an expected state of affairs, except for the fact that spring arm 100B is flexed quite considerably as compared to the deflection of beam 10, whereas the usual prior art practice is to construct force lever 100 as an entirely rigid member, whereby each arm of lever 100 deflects about the same amount as the other, and the deflection is about the same order as that of beam 10.

In practice it is found, usually, that the primary system of the transmitter, generally speaking: body B, beam 10, diaphragms 2 and 102, etc., has an overall temperature sensitivity which makes the deflection of beam 10 a function of primary temperature as well as of differential pressure. This sensitivity may have various sources, such as change in dimension and/or elastic properties of various parts of the primary system. However this may be, the result is that it is as if the amount of feedback force on beam 10, needed to balance the force due to a given value of differential pressure, varies as a function of the temperature of the primary system.

In the present instance, the primary system, if constructed as described in the above-mentioned co-pending application of Tate et al., has a positive temperature-force characteristic, i.e., as primary temperature increases, the same value of differential pressure requires a larger and larger value of rebalancing force on beam 10. Since the secondary system of the transmitter, generally speaking: baffle 75, nozzle 76, bellows 82, force lever 100, etc., automatically rebalances beam 10, the rebalancing force increase required is obtained by an increase in rebalance pressure. As such increase is due to temperature, not to the differential pressure, a measurement of the latter in terms of the feedback pressure in bellows 82 involves a temperature error.

According to the invention, such error may be obviated if the secondary system be provided with means responsive to temperature such as to cause the feedback force, corresponding to a given value of feedback pressure, to increase in accordance with the temperature-dependent component of the primary's need for rebalance force on beam 10.

As the concern is to get an increased feedback of force without, however, increasing the feedback pressure, in accordance with the invention, we provide that the effective stiffness of bellows 82 decreases as its temperature increases.

The effective stiffness of bellows 82 is that due to itself and to spring 83, and the force it can produce depends on this effective stiffness, the effective area of the bellows, the pressure applied thereto, and on the stiffness of the mechanism via which the bellows exerts such force on beam 10. For the present purpose, such force may be considered to be rigidly applied to beam 10, except insofar as arm 100B is concerned.

To increase the feedback force, either or both of bellows 82 and spring 83 may be chosen to be of material that becomes less stiff as the temperature increases. This being the case, as temperature increases, less feedback pressure is involved in contracting and expanding bellows 82, so that more is available for bending arm 100B. Note that arm 100B should not decrease in stiffness, for if it does, the additional force available from the bellows will begin to be used up in bending arm 100B rather than being transmitted via arm 100B to beam 10.

According to the invention, arm 100B is made temperature insensitive as by making it of Ni Span C or like well-known alloy, the elastic modulus of which is substantially unaffected by temperature. On the other hand, bellows 82 may be made of brass and spring 83 of phosphor bronze, which materials grow less stiff as the temperature increases.

As a result, as the temperature of the transmitter increases, the amount bellows 82 expands for a given increase in differential pressure also increases, since spring 83 and/or the inherent spring nature of the bellows itself has less control over the bellows. Consequently, spring 100B, whose stiffness does not change with temperature, must absorb an increasing amount of deflection, and consequently, exert a larger force on beam 10 than it would have had the temperature not increased (but all else were the same).

The foregoing assumes substantially uniform temperature among the parts of the transmitter. This is sufficiently the case in practice as the parts of the transmitter are mainly metallic objects initimately associated together in an integral structure.

It is to be noted that the foregoing principle of force compensation cannot well be applied in a conventional force balance instrument of the sort wherein all net motion is suppressed insofar as possible. For example, one may suppose flexible arm 100B of the present transmitter to be rigid, in which case it will be evident that the instrument will remain operative to balance beam 10. However, bellows 82 has practically no leeway at all as to expansion and contraction, for beam 10 will not deviate from a given position by more than the amount required to cause baffle 75 to move between the position wherein it least impedes air flow from nozzle 76 and the position wherein it most impedes such flow. As the distance between such positions is a thousandth of an inch or so, and since baffle 75 is normally pivoted at such a point that the motion of pin 77 is magnified about ten times at the nozzle, the parts of the force balance system would not vary position considerably, if rigidity prevailed, as it does, in effect. In other words, a substantial movement of the end 82A of bellows 82 is necessary to create a change in feedback force that will fully compensate the effect of a temperature change on the force exerted by beam 10.

Temperature effects involving dimensional changes also affect baffle nozzle spacing, or the configuration and/or position of parts involved in the force balance, hence, the output pressure will generally reflect such changes. As there are numerous known expedients for coping with such effects, those adopted in this case may vary considerably. However, it is necessary to point out that this sort of compensation is over and above that described supra. The latter takes into account only the fact that, in the absence of feedback, the angular position of beam 10 for a given differential pressure varies with primary temperature, whereas the former considers only temperature effects remaining after the primary is compensated as described. Such remaining temperature effects are mainly due to simple thermal expansion effects, whereas the preceding effects involve mainly variation of effective area exposed to pressure and variations of stiffness of the various elastic members making up the transmitter. It is also to be remarked that while the foregoing is a reasonably complete and thorough description of the elements making up the temperature sensitivity of the transmitter, we do not wish to be bound thereby, since compensation as conceived by us in the case of the primary, supra, is of a net effect requiring a change in force, and what is behind said effect is not crucial. The like is also to be understood insofar as what now follows is concerned.

In any event, most convenient, we find, are the expedients of making one or several flexures of the cross-strip pivots out of bimetallic material and of making the nozzle structure and/or support from a composite of elements having different coefficients of expansion, the collective effect of these expedients being adjusted so as to just neutralize the effect of temperature change other than those due to primary temperature sensitivity.

Thus, the flat flexure strips of pivot 84 may one or more be made of bimetal laminae that attempt to bend out of their planes under the influence of temperature, whereby it results by proper choice of material, dimensions thereof, etc., the pivot 84 develops a torque in response to temperature that opposes the effects of other temperature dependent torques due to temperature-induced dimensional changes.

As for the baffle/nozzle structure, the baffle 75 may be responsive to temperature to vary its spacing from nozzle 76 as a function of baffle temperature. Again, the pin 77 may be mounted on a support of material having a different coefficient of expansion from pin 75. Thus, the left-hand end 77A of pin 77 may be fixed to the left-hand end 78A of a sleeve 78, the right-hand end of which is secured to the arm 10A projecting from the side of beam 10. As these parts expand, say, sleeve 78 will shift the pin 77 bodily to the left, whereas pin 77 will elongate so that its right-hand end moves to the right. If sleeve 78 be made of invar, and pin 77, of stainless steel, baffle 75 shifts position with respect to the nozzle, an effect that may be used to counter the overall dimensional effects of temperature.

In a pressure operated primary, the pressures in the primary attempt to extrude beam 10 from body B. In the specific form of primary shown, stay plate S for the beam is extremly stiff, and the primary is otherwise designed to minimize such extrusion. Nevertheless, at high levels of the pressure in the primary, there is some extrusion of the beam, which because of the inclination of the profile of beam, produces a definite deflection of the beam, i.e., if the beam is extruded along its main axis upwardly, the sloping away of the profile allows the beam to deflect slightly, whereby baffle and nozzle spacing changes and creates a net change in feedback pressure, if nothing is done to prevent such change.

In order to prevent this from occurring, baffle 75 is so mounted that it inclines in the same direction as the inclined profile 85A of plate 85. As a result, as the beam deflects upon extrusion, the pin slides along the corresponding baffle profile, causing some deflection of the baffle lever 75. Such deflection causes a change in feedback pressure that is opposite in sense to that due to deflection of the beam as a result of the change in relation of edge 85A to knife edge 88C. By proper choice of the direction of said baffle profile, these two changes may be made to neutralize each other.

The orientation shown here is only approximate and must be fixed by trial. However, one skilled in the art will be able to routinely determine the precise inclination of baffle best compensating for the effect of pressure level change. In the present case, that excellent compensation was consistently obtained, where the angle of edge 85A was 20°, by inclining baffle 75 at an angle of from 6°–7°, such angles being measured from the vertical.

It is to be understood that a transmitter having a range of so many p.s.i. differential pressure may conceivably be used where such difference is between pressures whose level is on the order of atmospheric, or at least sufficiently low that the above special baffle orientation is not needed, (if present, it would have no effect), since extrusion of beam 10 would not be appreciable in its effect.

The motions of pin 77 are rather minute and easily hindered by friction between baffle 75 and pin 77. While rounding the end of pin 77 contacting baffle 75 to a large extent obviates such frictional effects, allowing the pin end to slide fairly freely on baffle 75, the pin end does not slide to quite the positions it should, because of friction. However, by making the pin 77 only sufficiently stiff as to be able to transmit along its length, beam deflections to the baffle, the vertical motions of beam 10 flex the pin rather than slide its end over the baffle surface, so that the contact of pin and baffle remains fixed, thus obviating the problem of sliding friction.

The foregoing improvements relating to the operation of the transmitter of FIGURE 1 make such precision of operation possible that we have found that conventional fulcrums such as might be used on arm 100A to be inadequate as to fineness, definiteness and stability of adjustment. Ordinarily, such a fulcrum is designed so that it can be moved along a beam to (ideally) any given position and there fixed in place, thus fixing the ratio of feedback pressure in bellows 82 to the difference in pressure across diaphragms 2 and 102 at any one of a range of such ratios.

The fulcrum F, as shown in FIGURE 1, is in two parts, one a sleeve 87 embracing arm 100A and having a coaxial threaded portion 87A projecting toward the other of said parts, also more or less a sleeve 88 embracing arm 100A and having a pair of projections 88A extending toward sleeve 87, parallel to the axis of sleeve 87 and at diametrically opposite points of sleeve 88. Each said projection has a notch 88B, and there is a ring nut 89, interiorly threaded to mate with the thread on sleeve 87, received between said notches.

It is evident that ring nut 89, which is dimensioned to be freely rotatable when received in notches 88B, can, if rotated (sleeves 87 and 88 being prevented from rotation but remaining free to slide along arm 100A), cause sleeves 87 and 88 to either retreat from each other or approach each other along arm 100A. At the same time, arm 100A holds the sleeves 87 and 88, and ring nut 89 in coaxial relation on the arm 100A.

In order to provide for adjustment of fulcrum F to different fixed positions, set screws 90 and 91 are provided, one for sleeve 87 and one for sleeve 88, being tapped into the sides of the sleeves so that they can be threaded toward and away from the side of arm 100A. Hence, by threading screws 90 and 91 toward arm 100A far enough, sleeves 87 and 88 are frictionally bound against movement along arm 100A.

Sleeve 88 is also provided with a sort of knife edge 88C projecting radially therefrom into contact with the inclined edge 85A of plate 85, to define the effective lever arms of beam 10 and lever 100 on each other.

Accordingly, by loosening both of set screws 90 and 91 and sliding fulcrum F to the approximately correct position of the contact of knife edge 88C with arm 100A, the fulcrum as a whole can be locked into place by screwing set screw 90 in until sleeve 87 is locked against movement along the length of arm 100A.

At this point, a more precise position for knife edge 88C can be selected by rotating ring nut 89, so that it moves sleeve 88 along the length of arm 100A toward such position. When such position is located, then screw 91 can be screwed into sleeve 88 until it binds the sleeve 88 against the arm 100A, locking knife edge 88C in final adjusted position.

It is evident that the foregoing construction of fulcrum F provides a true micrometer adjustment of the contact of knife edge 88C with the inclined edge of plate 85.

FIGURES 2 and 3 illustrate a more refined form of fulcrum F of FIGURE 1. As indicated by the use in these figures of many of the same reference numerals in FIGURE 1, fulcrum F' of FIGURES 2 and 3 is much the same as fulcrum F of FIGURE 1. However, instead of knife edge 88C shown in FIGURE 1 in the conventional form of a wedge-like body that would be a rigid extension, in effect, of sleeve 88, the sleeve 88 instead has affixed thereto, in any convenient manner, a knife edge 92 in the form of a thin spring lamina, the plane of which lies more or less normal to the inclined edge of plate 85. The lamina is just thick enough to rigidly transmit forces in its plane, while remaining capable of bending in response to forces exerted transverse to its plane by the arm 100A. As the edge of the lamina contacting the inclined edge of plate 85 is frictionally prevented from sliding thereon, when the angular relationship of arm 100 and beam 10 changes, due to their deflecting, the lamina bends while maintaining a fixed place of contact with plate 85, so that none of the feedback force transmitted by knife edge 92 is lost to friction as it would be if it were rigid and had to slide along the inclined edge of plate 85 as arm 100A deflected.

Sleeve 87 is provided with a radial boss 93, provided for the purpose of fixedly mounting fingerlike retainers 93A which slidably receive one of the projections 88A. Retainers 93A provide for maintaining sleeves 87 and 88 in the correct angular relationship to each other when ring nut 89 is in position on the threaded portion of sleeve 87 and received in the notches 88B, but the fulcrum assembly is not yet mounted on arm 100A.

A similar boss 94 is provided on sleeve 88 in alignment with the projection 88A received between retainers 93A, and both bosses are tapped at 90A and 91A, respectively, to receive set screws 90 and 91 (not shown in FIGURES 2 and 3) for the purpose of locking fulcrum F' on arm 100A.

Finally, to maintain the proper orientation of fulcrum F' on arm 100A, the outer periphery of arm 100A, the inner contours of sleeves 87 and 88 may, as exemplified at 95, be given a hexagonal or other non-circular contour to prevent the fulcrum from rotating about the length of arm 100A, which arm, of course, is provided with a like cross-section.

The need for the micrometer adjustment is dictated by the fact that at larger ranges of differential pressure a thousandth of an inch of position change on the part of the knife edge of the fulcrum is significant. Thus, the fulcrum position along edge 85A corresponding to a range of 200 p.s.i differential pressure range is only about 3/16″ from the position thereof for a 250 p.s.i. differential pressure range.

On the other hand, it is desirable that range changes be made while the fulcrum is loading the beam 10, in which case, it is impossible to simply slide the fulcrum as a whole precisely to the desired point. The micrometer action of ring nut 89, on the other hand, after sleeve 87 has been locked into about the correct position, allows sleeve 88 to be moved by minute, determinate amounts until the knife edge 88C (or 92) is in the exact position, which is then maintained by locking sleeve 88 by means of set screw 81A.

In order to prevent indeterminacy of position of sleeve 88 it is desirable to make the contact of sleeve 88 on arm 100A unambiguous. In fulcrum F' this is provided for by the flat closest to knife edge 92, for the said flat affords a stable contact with the adjoining flat on arm 100A. These flats in practice will provide contact only at spaced points, so that it is desirable to locate hole 91A so that its center line also passes through the place of contact of the knife edge with edge 85A, otherwise the force on the fulcrum may cock the sleeve 88 and change the effective place of contact of edge 85A and the knife edge.

It is also well to provide that the edge 85A and the contacting edge of the knife edge be hard enough that the loading of their contact, or sliding therebetween does not dent, scratch, or otherwise deform such edges.

The pivot axes corresponding to pivot 84, knife edge 88C (or 92) and stay plate S are substantially in a straight line, and remain very nearly so during normal operation of the instrument. This minimizes any tendency of knife edge 92 to slip along edge 85A for by making knife edge 92 sufficiently flexible the loading of the knife edge on ede 85A need not be extremely high to create enough frictional resistance to knife edge slip that it rather flexes.

Moreover, even with a rigid knife edge, as knife edge 88C may be supposed to be, sliping is kept to a minimum by the alignment of pivot axes described next supra.

As a matter of mechanism, note that body B and subhousing 200 form the fixed or stationary bar of a four-bar linkage, to which fixed bar are pivoted two more bars in the form of arm 100A and of the plate 85 and the upper part of beam 10 together. The fourth bar is, in effect, the fulcrum F (or F').

In accordance with the statute, we have set forth herein novel improvements in process variable transmitters, in such detail as to enable one skilled in the art to practice the invention in its best form as that is known to us thus far. As such improvements may find utility in organizations other than that disclosed, and as the transmitter disclosed may possess other features than we disclose or than we disclose in detail, with which our invention may be used though not dependent thereupon, it is to be understood that the description supra is to be taken as neither limiting nor exclusive, but rather as exemplary, and that the bounds of our invention are to be sought in the claims appended hereto.

We claim:

1. A force balance mechanism including a four bar linkage wherein a bar linking one deflectibly-mounted bar with another deflectibly-mounted bar is in the form of a fulcrum member fixed to the second-said bar and having a knife edge contacting the third-said bar, whereby the effective length of said second-said bar and of said third-said bar are determined by the position of said fulcrum member, and wherein said fulcrum is constructed and arranged for occupying different fixed positions along said second-said bar, the improvement comprising adjustment means interconnecting said knife edge and said fulcrum member and being constructed and arranged to provide different positions of said knife edge with respect to said fulcrum member and with respect to any of the said different positions of said fulcrum member along said second-said bar, whereby to afford a fine adjustment of said effective lever arms as defined by the location of the deflection axes of said second-said and said third-said bars and the place of contact of said knife edge and said third-said bar; said mechanism also including first responsive means arranged to deflect said second-said bar about one of said deflection axes and second responsive means arranged to deflect said third-said bar about another of said deflection axes, one of said responsive means being responsive to deflection of one of said bars to exert a force on said bars such as to deflect said one of said bars in opposition to said deflection, and the other of said responsive means being responsive to a variable independent of said mechanism for causing said deflection.

2. The invention of claim 1, wherein said fulcrum member is a first threaded element and said knife edge has a second threaded element associated therewith, one said element threading into the other and so oriented that the axis of threading is along the effective length of the said second-said bar, and said fulcrum member is slidably mounted on said second-said bar.

3. The invention of claim 2, wherein means is provided for fixing each said element in position with respect to the said second-said bar, independently of the other.

4. The invention of claim 1, wherein said fulcrum member comprises a first annular member which is slidably mounted on said second-said bar and which has said knife edge projecting therefrom; a second annular member being mounted on said second-said bar alongside said first annular member, and an adjustment mechanism linking said annular members for varying the spacing therebetween along said bar; there being means for fixing said annular members in position on said bar and with respect to each other.

5. The invention of claim 4, wherein means is provided for fixing each said annular member in position with respect to said second-said bar, independently of the other.

6. The invention of claim 4, wherein said adjustment mechanism includes a third annular member mounted on said second-said bar and effectively fixed to one of said first and second annular members, but rotatable with respect thereto, and being provided with threads the axis of which is the axis of rotation of said third annular member, the other of said annular members being provided with threads whose axis is also said axis of rotation, one set of said threads interengaging the other set of said threads, whereby rotation of said third annular member provides for displacing said first and second annular members in opposite directions along said second-said beam.

7. A process variable transmitter of the force balance type including a primary having a rigid beam deflectible about a fixed axis from a given position by means elastically responsive to a process variable and being constructed so as to elastically resist deflection of said beam; said transmitter also including detecting means responsive to beam position to produce a signal corresponding to beam position and changing in a sense corresponding to the sense of deviation of said beam from said given position; said transmitter also including a secondary having feedback means responsive to said signal, said feedback means comprising a motor responsive to said signal to move an element of said motor to a position in a given path such that said position of said element corresponds to the magnitude of said signal, and a lever having one part thereof connected to said element and another part thereof supported for deflection about a fixed axis; said axes being so located that the path of deflection of a portion of said lever intersects the path of deflection of a portion of said beam; and force-transmitting means interconnecting said portions, the arrangement being that deflection of said beam causes said signal to change in a sense such as to cause said motor to attempt to deflect said lever in a sense such as to oppose the last said deflection of said beam, whereby said feedback means maintains said beam in substantially said given position in spite of changes in said process variable; said force transmitting means being a member mounted on one of said lever and said beam and being adjustable therealong to different fixed positions along the lever arm of the other of said lever and said beam; said member having a knife edge projecting therefrom contactible with said other of said lever and said beam so as to define said lever arm; said knife edge being adjustable along said lever arm with respect to the remainder of said member, whereby to provide for defining the length of said lever arm by adjusting said member as a whole, and/or by adjusting said knife edge alone.

8. A process variable transmitter of the force balance type including a primary having a rigid beam deflectible about a fixed axis from a given position by means elastically responsive to a process variable and being constructed so as to elastically resist deflection of said beam; said transmitter also including detecting means responsive to beam position to produce a signal corresponding to beam position and changing in a sense corresponding to the sense of deviation of said beam from said given position; said transmitter also including a secondary having feedback means responsive to said signal, said feedback means comprising a motor responsive to said signal to move an element of said motor to a position in a given path such that said position of said element corresponds to the magnitude of said signal, and a lever having one part thereof connected to said element and another part thereof supported for deflection about a fixed axis; said axes being so located that the path of deflection of a portion of said lever intersects the path of deflection of a portion of said beam; and force-transmitting means interconnecting said portions, the arrangement being that deflection of said beam causes said signal to change in a sense such as to cause said motor to attempt to deflect said lever in a sense such as to oppose the last said deflection of said beam, whereby said feedback means maintains said beam in substantially said given position in spite of changes in said process variable; said lever having an elastic section located between the connection of said lever to said element and the connection of said lever to said force transmitting means; said primary having a net temperature-varying force effect reflected in the deflection of said rigid beam, and said secondary having a net temperature-varying stiffness with respect to deflections of said lever, such temperature variation of stiffness being due to materials used in constructing said secondary, and certain of said materials being so chosen that the said force effect is substantially neutralized by the net temperature-varying stiffness of said secondary.

9. The invention of claim 8, wherein said elastic section preserves substantially constant stiffness in spite of temperature changes; said motor including elastic means arranged to convert said signal to force and to apply said force to said elastic section via movement of said element under control of the stiffness of said elastic section and of the stiffness of said elastic means; said elastic means having a stiffness decreasing with temperature increase therein.

10. The invention of claim 8, wherein said elastic section is made of material in the nature of Ni Span C as to elastic properties, said feedback means being of the pneumatic type wherein said motor includes bellows means responsive to expand and contract under the influence of pneumatic pressure and having elastic means in the nature of a phosphor bronze spring resisting expansion of said bellows means, and means providing such pneumatic pressure for said bellows and in accordance with said signal.

11. A process variable transmitter of the force balance type including a primary having a rigid beam deflectible about a fixed axis from a given position by means elastically responsive to a process variable and being constructed so as to elastically resist deflection of said beam; said transmitter also including detecting means responsive to beam position to produce a signal corresponding to beam position and changing in a sense corresponding to the sense of deviation of said beam from said given position; said transmitter also including a secondary having feedback means responsive to said signal, said feedback means comprising a motor responsive to said signal to move an element of said motor to a position in a given path such that said position of said element corresponds to the maggnitude of said signal, and a lever having one part thereof connected to said element and another part thereof supported for deflection about a fixed axis; said axes being so located that the path of deflection of a portion of said lever intersects the path of deflection of a portion of said beam; and force-transmitting means interconnecting said portions, the arrangement being that deflection of said beam causes said signal to change in a sense such as to cause said motor to attempt to deflect said lever in a sense such as to oppose the last said deflection of said beam, whereby said feedback means maintains said beam in substantially said given position in spite of changes in said process variable; said beam having two lever arms, one thereof acted upon by said means elastically responsive to a process variable and the other thereof being acted upon by said lever via said force transmitting means, the angle between said lever arms being substantially other than 180°.

12. The invention of claim 11, wherein said beam and said lever have their deflection axes substantially in alignment with the effective point of application of said force transmitting means to said beam.

13. The invention of claim 11, wherein said detecting means includes a lever pivotally mounted for deflection in response to deflection of the second said lever arm of said beam; the last said lever extending toward the direction of the second said lever arm of said beam, and the angular position thereof determining the said signal; there being a pin secured at its one end to one of said beam and said last said lever, the other end thereof being connected to the other of said beam and said last said lever, the arrangement being that the angular position of said last said lever is a function of the position of said pin as determined by said beam, whereby the angular position of said last said lever is also a function of motion of said beam in the direction of its first said lever arm; the direction of the said last said lever being so chosen that change in its angular position resulting from motion of said beam in the direction of its first said lever arm causes said signal to change in such fashion as to substantially neutralize the effect on said signal due to deflection of said beam caused by motion thereof in the direction of its first said lever arm.

14. The invention of claim 13, wherein the second said end of said pin is rounded and in sliding contact with said other of said beam and said last said lever.

15. The invention of claim 13, wherein said pin is flexible.

16. A pressure transmitter having a primary including a rigid beam deflectible about a given axis in response to pressure applied to said primary, said beam displaceable by such pressure in a direction transverse to said axis; said beam having an effective lever arm the length of which lies transverse to said direction; force balance means automatically preventing substantial deflection of said beam about said given axis, and including a fulcrum via which balancing force is exerted on said effective lever arm, said force balance means including deflection sensing means; said deflection sensing means including a straight lever pivotally mounted adjacent said beam and connected thereto; there being a contact pin fixed to said beam and extending therefrom to said lever, and contacting the latter; and said straight lever extending in a direction roughly parallel to the direction of the said effective length of said lever arm, whereby if said beam is displaced in the first said direction, said force balance means will experience in effect a deflection of two effects each being as if a deflection of said beam, one said effect being in respect of the force exerted on said beam via said fulcrum and the other of said effects being in respect of the displaced position of said beam as sensed by said deflection sensing means, said deflection sensing means being constructed and arranged so that the sense of the one said effect is opposite that of the other.

References Cited by the Examiner
UNITED STATES PATENTS

| | | | |
|---|---|---|---|
| 1,144,837 | 6/1915 | Greve | 92—161 |
| 2,539,117 | 1/1951 | Burdick | 74—522 |
| 2,658,392 | 11/1953 | Vannah | 137—85 X |
| 2,793,540 | 5/1957 | Cronk | 74—522 |
| 2,798,777 | 7/1957 | Flick | 92—161 |
| 2,842,148 | 7/1958 | Jones | 137—85 |
| 2,986,151 | 5/1961 | Shannon | 137—85 |
| 3,014,494 | 12/1961 | Scott | 137—561 |
| 3,033,231 | 5/1962 | Perkins | 137—561 |
| 3,132,661 | 5/1964 | Flesor | 137—85 |

ALAN COHAN, *Primary Examiner.*

WILLIAM F. O'DEA, *Examiner.*